US011878909B2

(12) United States Patent
Ma

(10) Patent No.: US 11,878,909 B2
(45) Date of Patent: Jan. 23, 2024

(54) METHOD FOR PREPARING MODIFIED GRAPHENE AND METHOD FOR PREPARING SLURRY CONTAINING THE MODIFIED GRAPHENE

(71) Applicant: CHANGSHA TIANYUAN EMPIRE MATERIALS TECHNOLOGY CO., LTD., Changsha (CN)

(72) Inventor: Jinhua Ma, Changsha (CN)

(73) Assignee: CHANGSHA TIANYUAN EMPIRE MATERIALS TECHNOLOGY CO., LTD., Changsha (CN)

( * ) Notice: Subject to any disclaimer, the term of this patent is extended or adjusted under 35 U.S.C. 154(b) by 452 days.

(21) Appl. No.: 17/276,055

(22) PCT Filed: Nov. 11, 2020

(86) PCT No.: PCT/CN2020/128034
§ 371 (c)(1),
(2) Date: Mar. 12, 2021

(87) PCT Pub. No.: WO2021/093759
PCT Pub. Date: May 20, 2021

(65) Prior Publication Data
US 2022/0017370 A1    Jan. 20, 2022

(30) Foreign Application Priority Data
Nov. 11, 2019  (CN) .......................... 201911097413.5

(51) Int. Cl.
*C01B 32/194* (2017.01)
*C01B 32/192* (2017.01)
(Continued)

(52) U.S. Cl.
CPC .......... *C01B 32/194* (2017.08); *C01B 32/192* (2017.08); *C09C 3/06* (2013.01); *C09C 3/10* (2013.01); *C09C 3/12* (2013.01)

(58) Field of Classification Search
CPC ....... C01B 32/192; C01B 32/194; C09C 3/06; C09C 3/10; C09C 3/12
See application file for complete search history.

(56) References Cited

FOREIGN PATENT DOCUMENTS

| CN | 105829245 A | * | 8/2016 | ............. C01B 31/04 |
| CN | 106519901 A | * | 3/2017 | ............... C08K 3/04 |

(Continued)

*Primary Examiner* — Richard M Rump
(74) *Attorney, Agent, or Firm* — FINNEGAN, HENDERSON, FARABOW, GARRETT & DUNNER, LLP

(57) ABSTRACT

A method for preparing modified graphene and a method for preparing a slurry containing the modified graphene are disclosed. The method for preparing a modified graphene comprises: putting a flake graphite powder, a silicon molecular modifier, water and a boric acid solution into a high pressure container, filling a liquid gas into the high pressure container, connecting the high pressure container to a solid gas preparation apparatus, to solidify the liquid gas and obtain a solid gas, putting the solid gas into a ultraviolet washing machine for ultraviolet high-energy radiation, exfoliating the graphene flake, continuously exposing to ultraviolet light for a period of time to form a modified graphene, continuously exposing the modified graphene under the ultraviolet light, and storing the modified graphene in vacuum as an intermediate.

18 Claims, 2 Drawing Sheets

(51) Int. Cl.
*C09C 3/12* (2006.01)
*C09C 3/06* (2006.01)
*C09C 3/10* (2006.01)

(56) References Cited

FOREIGN PATENT DOCUMENTS

| CN | 109250706 A | * | 1/2019 | ........... C01B 32/184 |
| CN | 111186874 A | * | 5/2020 | .............. B01J 20/20 |

* cited by examiner

METHOD FOR PREPARING MODIFIED GRAPHENE AND METHOD FOR PREPARING SLURRY CONTAINING THE MODIFIED GRAPHENE

CROSS REFERENCE TO RELATED APPLICATION

This application is a U.S. national phase entry application under 35 U.S.C. § 371 from PCT International Application No. PCT/CN2020/128034, filed Nov. 11, 2020, which claims priority to Chinese Patent Application No. 201911097413.5, filed Nov. 11, 2019; the contents of each application is incorporated herein by reference in its entirety.

TECHNICAL FIELD

The present disclosure relates to the technical field of the preparation of modified graphene, and in particular to a method for preparing a modified graphene and a method for preparing a slurry containing the modified graphene.

BACKGROUND

The corrosion of materials, especially the steel material, has caused tremendous loss to the national economy, reaching 3-5% of the Gross Domestic Product (GDP). Specifically, the material corrosion has caused immeasurable accident and indirect loss, and is severer in the fields of petroleum, refining, chemical industry, metallurgy, electric power, environmental protection, ocean engineering, etc. At present, the coating technology serves as the most economical, direct and effective way for corrosion protective, and the current anti-corrosion coating are mainly based on two mechanisms: the paintcoat barrier protection and the electrochemical protection, wherein coatings relying on the barrier protection mainly include cloud irons, glass flakes, graphenes, etc, and coatings relying on the electrochemical protection mainly include zinc-rich coatings, aluminum-rich coatings, iron red, chromates, phosphates, organic corrosion inhibitor, etc. However, under the conditions involving direct contact with chemical corrosion mediums, such as acidic or alkaline substances, it is difficult to use the coatings relying on the electrochemical protection. At present, there are mainly two more advanced coatings: one is a graphene coating, and the other is a titanium nano-polymer coating. These two coatings are currently widely used in some severe corrosion fields, and have achieved certain application effects. However, due to the fact that the graphene is a two-dimensional sheet nanomaterial and has a huge specific surface area, it is prone to agglomeration and thus sedimentation, which hinders further applications of graphene in heavy-duty anti-corrosion coating. In view of this, it is a critical issue how to solve the dispersion stability of graphene in the coatings. The current technical routes for making graphene slurry are to prepare graphene first and then modify it, but the powder graphene formed during the preparation has agglomerated; under such circumstances, when dispersing and modifying the graphene again to prepare a slurry, it is difficult to reopen its lamellar structure, resulting in that it is impossible to uniformly modify each lamellar structure of graphene. Therefore, it is urgent to prepare a titanium-silicon modified graphene slurry that is easy to disperse but not easy to agglomerate, to solve the problems of agglomeration and sedimentation of graphene in the coatings. In summary, in terms of the above two technologies, there are still technical bottlenecks, and it is difficult to simultaneously meet the five key performance requirements for a long-term and heavy-duty anti-corrosion coating: paintcoat supercompact, paintcoat composition stable, adhesion and wet film adhesion superstrong, electrochemical protection, and internal stress.

There is some difficulties in the preparation of graphene in the prior art. The current method for preparing graphene mainly includes: epitaxial growth, vapor deposition, mechanical exfoliation, redox, multiphase quantum self-coupling reaction exfoliation, etc, which are complicated for operation, or have low yields, or have high costs, or are not environmentally friendly; thus, they are not suitable for large-scale applications. In addition, the graphene prepared by the above methods, regardless of being a multi-layer or a single-layer structure, is easy to agglomerate, greatly hindering the dispersion and modification at the later stage, and as a result, it is very difficult to redisperse the prepared graphene in the coating at the later stage, and the effect of using the lamination of graphene to improve the compactness of coating is often greatly reduced. Moreover, the graphene is free in polymer materials and acts as a filler, and thus it brings about a limited improvement on the mechanical properties of the paintcoat. Also, the graphene prepared by the above methods is a carbon anode material with extremely strong conductivity, being only suitable for adding into a zinc-rich paintcoat in the field of anti-corrosion coating. In this case, the excellent conductivity and excellent barrier properties of graphene makes it possible to reduce the addition amount of zinc powder. However, in an acidic, humid or strongly alkaline environment, the zinc-rich coating will quickly failure, while in an acid and alkali salt resistant and humid resistant environment, when nanomaterials is combined with graphene, said graphene in turn acts as a carbon anode material to form galvanic couple corrosion, resulting in a worse embarrassing situation with graphene.

An article "Research Progress of Preparation Method of Graphene" published by Chen Bin in "Modern Chemical Research" recites that graphene is a two dimensional crystal material with single atomic layer that is composed of SP2 hybrid carbon atoms. Because of its superior physical and chemical properties, the graphene has great application potential in the fields of gene electronic sequencing, nano-electronic devices, sensors, graphene super glass, etc. Nevertheless, since there are still great challenges in the preparation of graphene with large area and high quality, it is impossible to produce high quality graphene on a large scale yet, being still in the laboratory exploration stage.

Chinese Patent Application No. CN200410036761.9 discloses a rare metal alloy nano-powder and a preparation method thereof. The method includes the following steps: mixing different proportions of one or more of tantalum, zirconium, niobium, palladium and titanium powder with a dispersant in a certain proportion, and putting the mixture in a bonding reactor; grinding the power in a vertical planetary high energy ball machine while adding a protective agent and protective gas to a certain extent, opening the feed valve and adding a bonding reactant, to perform a bonding reaction in a protective atmosphere. Using two steps of grinding and bonding reaction enables the nanocrystallization of rare metal to be realized, obtaining an active rare metal alloy nano-powder with a grain size of 20-30 nm. A dedicated bonding reactor is also provided to make the two steps of grinding and reaction realize in one device. Based on the rare metal alloy nano-powder with a grain size of 20-30 nm, the applicant have developed a bonding network type rare metal alloy nano coating. Such rare metal alloy nano coating exhibits excellent corrosion resistance and comprehensive performance.

Chinese Patent Application No. CN200610031721.4 discloses a method for preparing a titanium alloy nano-powder, in which raw materials for preparing the titanium alloy nano-powder include a titanium alloy coarse powder, a grinding aid bonding agent, a dispersant, and a surfactant. The method includes the following steps: feeding the raw materials into a reactor according to the ratio, and setting the reactor to have a revolving speed of 200-300 rpm, a temperature of 50° C.-60° C., and a rotation time of 15-30 minutes; increasing the revolving speed above 1000 rpm, holding the revolving speed for 1.5-2.5 hours, and increasing the temperature above 180° C.; reducing the revolving speed below 300 rpm, lowering the temperature to 40-50° C. within 0.5-1.0 hours, stopping the reactor to complete the preparation of nano-powder. With the method, it is possible to stably realize the nanocrystallization of titanium alloy, and thereby further improve corrosion resistance of nano-powder obtained by means of its small size effect and surface area effect, so that the nano-powder can be used as an active additive and is combined with various excellent resins to form a novel composite material.

Chinese Patent Application No. CN200810029936.1 discloses a nano organic titanium polymer and a coating thereof and a preparation method thereof. The polymerization reaction product in this disclosure is named nano organic titanium alloy hybrid polymer. According to this disclosure, a pure metal titanium powder is used as raw material, and mixed with a film forming resin and a solvent medium according to the formula ratio, and the resulting mixture is charged into a special closed planetary ball milling reactor for high speed grinding; in the presence of a catalytic agent, the accumulation of heat energy generated by grinding and the high pressure generated by solvent vaporization makes it possible to refine the grinded pure metal titanium powder to nanometer size, resulting in nanometer effect and then triggering polymerization. The polymer is an intermediate for the preparation of a nano organic titanium special coating. The intermediate polymer is compounded with a variety of film forming resins to produce high performance anti-corrosion coatings for different uses. All of the above technologies have the disadvantages of complicated process, small output scale, and high application cost.

SUMMARY

An objective of the present disclosure is to provide a method for preparing a modified graphene and a method for preparing a slurry containing the modified graphene. The present disclosure is intended to provide an efficient and environmentally friendly method for preparing a modified graphene, and the modified graphene prepared has surface functionalization, making it easy to be dispersed and grafted into various polymer mediums, and also making it be compounded and grafted with other nanomaterials for effective coating without forming a carbon anode. The present disclosure will be described in detail below.

The present disclosure provides a method for preparing a modified graphene, comprising the following steps:

S1: putting a flake graphite powder, a silicon molecular modifier, distilled water and a boric acid solution with a molar concentration of 1-2 mol/L into a stainless steel high pressure bottle, sealing the bottle, and slowly extracting air therein to make the vacuum degree in the bottle reach −0.09 to 0.1 MPa;

S2: filling a liquid gas into the stainless steel high-pressure bottle in step S1, shaking well and standing for 20-28 hours;

S3: connecting the stainless steel high-pressure bottle in step S2 to a solid gas preparation apparatus, to obtain a solid gas;

S4: putting the solid gas obtained in step S3 into a ultraviolet washing machine with wavelengths of 185 nm and 254 nm in sequence for ultraviolet high-energy radiation to produce micro burst, exfoliating to obtain modified graphene flakes, and simultaneously, functionally modifying the modified graphene flake with the solid gas to form carbonyl groups and carbon hydroxyl groups on the surface of the modified graphene flake, and grafting the carbonyl groups and carbon hydroxyl groups with silicon hydroxyl groups formed by hydrolysis of the silicon molecular modifier by high energy radiation, to obtain a crude modified graphene;

S5: continuously exposing the crude modified graphene obtained in step S4 to a ultraviolet light for 20-60 minutes to remove organic matters contained on the surface of the crude modified graphene, and meanwhile, continuing functionally modifying to form carbonyl groups and carbon hydroxyl groups, and grafting the carbonyl groups and carbon hydroxyl groups with silicon hydroxyl groups formed by hydrolysis of the silicon molecular modifier by high energy radiation, to form a modified graphene, and storing the modified graphene in vacuum as an intermediate for the preparation of a slurry comprising the modified graphene. This step is only to complete the preparation and initial modification of modified graphene.

In some embodiments, the raw materials for preparing the modified graphene comprises the following components in parts by weight:

5-25 parts of a flake graphite powder,
70-90 parts of a liquid gas,
1-5 parts of a silicon molecular modifier,
0.5-3 parts of distilled water, and
1-3 parts of a boric acid solution.

In some embodiments, the flake graphite powder has a particle size of 1000-3000 mesh.

In some embodiments, the liquid gas is at least one selected from the group consisting of liquid carbon dioxide, ozone, and liquid nitrogen.

In some embodiments, the silicon molecular modifier is at least one selected from the group consisting of silane coupling agent and compounds containing Si—OH.

In some embodiments, the silane coupling agent is at least one selected from the group consisting of low molecular silica sol, silicone resin, amino silane, epoxy silane, and mercapto silane, with the proviso that the functional groups of the silicon molecular modifier used in the preparation of the modified graphene powder are different from those of the silicon molecular modifier used in the subsequent formulation of silicon-titanium modified graphene ternary composite slurry. For example, if the amino modifier is used in the preparation of the modified graphene powder, the functional modifier used in the formulation of silicon-titanium modified graphene ternary composite slurry may be epoxy silane, or mercapto silane coupling agent.

In some embodiments, the solid gas in step S3 has a size of (80-120) mm×(40-60) mm×(10-30) mm.

It is understood that the modified graphene refers to silicon-titanium modified graphene.

The present disclosure further provides a method for preparing a silicon-titanium modified graphene slurry, including the following steps:

S1: adding a high purity nano-titanium powder, a silane coupling agent and an organic solvent into a beaker, mixing them evenly, then taking the modified graphene and putting it into the beaker, dispersing by an ultrasound, then adding distilled water, immediately putting them into a stainless steel autoclave and sealing the autoclave;

S2: putting the stainless steel autoclave in step S1 into an oven with a temperature of 110-120° C. for 6-12 hours to fully react, then cooling to 20-30° C., and taking out the resulting materials to obtain a silicon-titanium modified graphene slurry. In this step, the modification of the modified graphene is finally completed and the slurry containing the modified graphene is formed.

The silicon-titanium modified graphene slurry makes it possible to use the methods of high energy physical and chemical modification, and high temperature and high pressure hydrothermal to realize the organic bonding of silicon-titanium-carbon with the modified graphene as a supporter, preparing a silicon-carbon silicon-titanium carbon-titanium ternary composite modified graphene nano-metal hybrid polymer; then such a polymer is used as a modifier for an anti-corrosion coating, and is compounded with a special high molecular epoxy resin and crosslinker to form a silicon-titanium-carbon composite modified graphite nano anti-corrosive coating, which is a high-tech new product that combines modified graphene with titanium-silicon nano-polymer. The super anti-permeability of the modified graphene and the network structure of titanium-silicon nano-polymer make it possible to significantly improve the compactness of the paintcoat in which a chemical bond is formed between titanium-silicon nanometer material and polymer resin, enabling the paintcoat to have super adhesion and wet film adhesion, and at the same time, by exerting corrosion resistance of the modified graphene and titanium itself, it is possible to make the structure and composition of the coating be long-term stability without corrosion. In view of this, the modified nano heavy-duty anti-corrosion coating prepared with the modified graphene exhibits excellent corrosion resistance.

In some embodiments, the silicon-titanium modified graphene slurry comprises the following components in parts by weight:

8-12 parts of a silane coupling agent;
20-40 parts of an organic solvent;
10-20 parts of a high purity nano-titanium powder;
30-40 parts of the modified graphene; and
0.5-1 parts of distilled water.

In some embodiments, the organic solvent is at least one selected from the group consisting of absolute ethanol, acetone, and methylpyrrolidone. It should be emphasized that the silane coupling agent is at least one selected from the group consisting of low molecular silica sol, silicone resin, and functional modifier such as amino silane, epoxy silane and mercapto silane, with the proviso that the functional groups of the silicon molecular modifier used in the preparation of modified graphene powder are different from those of the silane coupling agent in the subsequent formulation of silicon-titanium modified graphene ternary composite slurry. For example, if the amino modifier is used in the preparation of the modified graphene powder, the functional modifier used in the formulation of silicon-titanium modified graphene ternary composite slurry may be epoxy silane, or mercapto silane coupling agent.

Compared with the prior art, the present disclosure has the following beneficial effects:

1. The present disclosure provides an efficient and environmentally friendly method for preparing a modified graphene; also, the modified graphene prepared by the same has surface functionalization, making it easy to be dispersed and grafted into various polymer mediums, and also making it be compounded and grafted with other nanomaterials for effective coating without forming a carbon anode.

2. The efficient and environmentally friendly method for preparing a modified graphene of the present disclosure has no emissions and no pollution, with a yield close to 100%.

3. In the present disclosure, by a two-step method, a modified graphene with high quality and few-lamella may be prepared. The modified graphene prepared by ultraviolet energy detonation micro-explosion method has intact and undamaged lamellas, and the amount of the lamellas is few. During the preparation process, the oxidation modification is carried out simultaneously, so that the modified graphene may graft with silicon molecular modifiers to avoid agglomeration and be easy to disperse.

4. In the present disclosure, by the high temperature and high pressure hydrothermal method, the modified graphene may be further modified and grafted, and at the same time, a novel material coated with the ternary composite modified graphene formed by combining titanium and silicon nanomaterials makes the grafting firm. Moreover, the slurry formed by the above formulation and process may be used for water and oil based coating system, and it is not necessary to divide the slurry into two categories used for water-based and oil-based metal anti-corrosive coatings, respectively.

DETAILED DESCRIPTION

Figure 1:
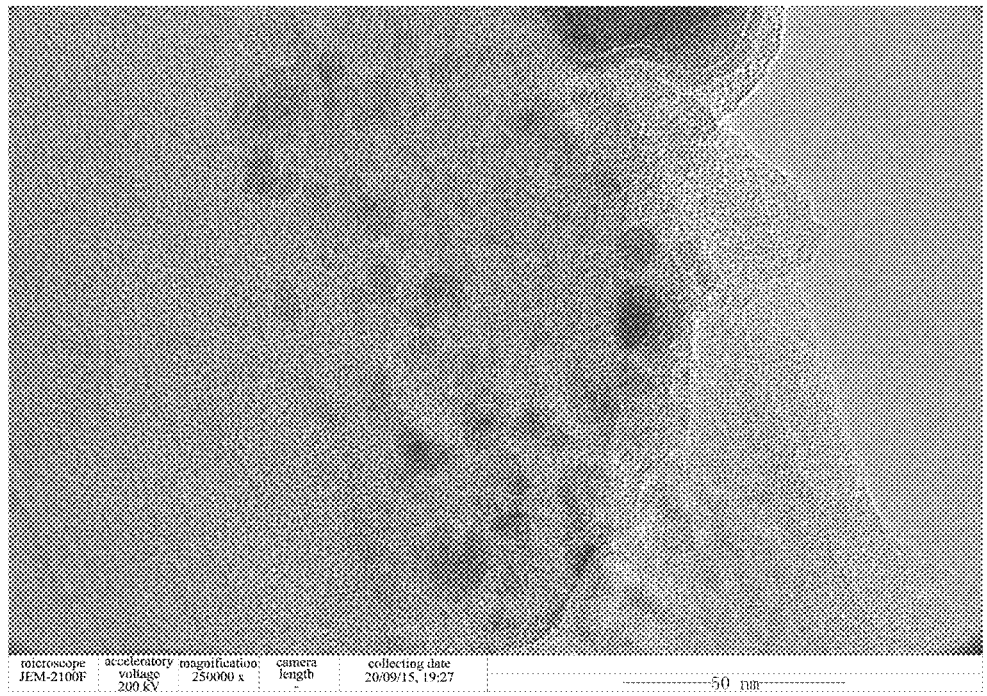
FIG. 1 shows a Transmission Electron Microscope (TEM) pattern of the silicon-titanium modified graphene slurry as prepared in Example 1.

In the following, the technical proposals in the embodiments of the present disclosure will be clearly and completely described, so that those skilled in the art could better understand the advantages and features of the present disclosure, so as to make a clearer definition for the protection scope of the present disclosure. The embodiments of the present disclosure as described are only a part of the embodiments of the present disclosure, not all of them. Based on the embodiments of the present disclosure, all other embodiments obtained by those skilled in the art without creative labor shall fall within the protection scope of the present disclosure.

Example 1

A method for preparing a modified graphene included the following steps:

S1: a flake graphite powder, a silane coupling agent, distilled water and boric acid solution with a molar concentration of 1.5 mol/L were placed into a stainless steel high pressure bottle, and the bottle was sealed.

The air in the bottle was slowly extracted, so that the vacuum degree in the bottle reached 0.09 MPa;

S2: a liquid gas was filled in the stainless steel high pressure bottle in step S1, and the resulting system was shaken well and stood for 24 hours;

S3: the stainless steel high pressure bottle in step S2 was connected to a solid gas preparation apparatus to obtain a solid gas;

S4: the solid gas obtained in step S3 was placed into a ultraviolet washing machine for ultraviolet irradiation until the solid gas was disappeared completely, to obtain a crude modified graphene; and S5: the crude modified graphene in step S4 was continuously exposed to the ultraviolet light for 30 minutes to remove organic matters contained on the surface of the crude modified graphene, and meanwhile, the functional modification was performed to form carbonyl groups and carbon hydroxyl groups, and the groups was grafted with the silicon hydroxyl formed by the hydrolysis of the silicon molecular modifier by high energy radiation, to obtain a functionalized modified graphene. The modified graphene was stored in vacuum.

Wherein, the raw materials for preparing the modified graphene comprised the following components in parts by weight:

6 parts of a flake graphite powder;
87.5 parts of a liquid gas;
3 parts of a silicon molecular modifier;
1.5 parts of distilled water; and
2 parts of a boric acid solution.

Wherein, the flake graphite powder had a particle size of 2500 mesh.

Wherein, the liquid gas was liquid carbon dioxide.

Wherein, the silicon molecular modifier was a low molecular silica sol.

Wherein, the solid gas in step S3 had a size of 100 mm×50 mm×20 mm.

Wherein, the ultraviolet washing machine was a drawer type with reflective cover, and the ultraviolet light in the ultraviolet washing machine had wavelengths of 185 nm and 254 nm.

A method for preparing a silicon-titanium modified graphene slurry included the following steps:

S1: a high purity nano-titanium powder, a silane coupling agent and an organic solvent were added into a beaker and mixed uniformly, and then the modified graphene was taken and put into the beaker, the resulting mixture was dispersed by ultrasound, distilled water was added, and then the resulting system was immediately put into a stainless steel autoclave and sealed;

S2: the stainless steel autoclave in step S1 was placed into an oven with a temperature of 115° C. for 9 hours to fully react, then cooled to 25° C., and after that, the resulting materials were taken out, to obtain the silicon-titanium modified graphene slurry.

Wherein, the silicon-titanium modified graphene slurry comprised the following components in parts by weight:

9 parts of a silane coupling agent,
40 parts of an organic solvent,
35 parts of a modified graphene,
15 parts of a high purity nano-titanium powder, and
1 part of distilled water.

Wherein, the organic solvent was absolute ethanol.

Wherein, the functional groups of the silicon molecular modifier used in the preparation of modified graphene were different from those of the silane coupling agent used in the formulation of silicon-titanium modified graphene slurry.

TEM test was performed on the obtained silicon-titanium modified graphene slurry, and the result was shown in FIG. 1. As shown in FIG. 1, the graphene obtained from the present disclosure had intact and undamaged lamellas, and the amount of the lamellas is few; titanium and silicon have been compounded on the modified graphene.

Example 2

A method for preparing a modified graphene included the following steps:

S1: a flake graphite powder, a silane coupling agent, distilled water and boric acid solution with a molar concentration of 1 mol/L were placed into a stainless steel high pressure bottle, and the bottle was sealed. The air in the bottle was slowly extracted, so that the vacuum degree in the bottle reached −0.09 MPa;

S2: a liquid gas was filled in the stainless steel high pressure bottle in step S1, and the resulting system was shaken well and stood for 20 hours;

S3: the stainless steel high pressure bottle in step S2 was connected to a solid gas preparation apparatus to obtain a solid gas;

S4: the solid gas obtained in step S3 was placed into a ultraviolet washing machine for ultraviolet irradiation until the solid gas was disappeared completely, to obtain a crude modified graphene; and S5: the crude modified graphene in step S4 was continuously exposed to the ultraviolet light for 20 minutes to remove organic matters contained on the surface of the crude modified graphene, and meanwhile, the functional modification was performed to form carbonyl groups and carbon hydroxyl groups, and the groups was grafted with the silicon hydroxyl formed by the hydrolysis of the silicon molecular modifier by high energy radiation, to obtain a functionalized modified graphene. The modified graphene was stored in vacuum.

Wherein, the raw materials for preparing the modified graphene comprised the following components in parts by weight:

10 parts of a flake graphite powder;
87 parts of a liquid gas;
3.5 parts of a silicon molecular modifier;
0.5 parts of distilled water; and
1 parts of a boric acid solution.

Wherein, the flake graphite powder had a particle size of 2000 mesh.

Wherein, the liquid gas was liquid carbon dioxide or liquid nitrogen.

Wherein, the silicon molecular modifier was a low molecular silica sol, silicone resin, or functional bis-silanes, such as amino siloxane, epoxy silane, and mercapto silane.

Wherein, the solid gas in step S3 had a size of 120 mm×60 mm×10 mm

Wherein, the ultraviolet washing machine was a drawer type with reflective cover, and the ultraviolet light in the ultraviolet washing machine had wavelengths of 185 nm and 254 nm.

A method for preparing a silicon-titanium modified graphene slurry included the following steps:

S1: a high purity nano-titanium powder, a silane coupling agent and an organic solvent were added into a beaker and mixed uniformly, and then the modified graphene was taken and put into the beaker, the resulting mixture was dispersed by ultrasound, distilled water was added, and then the resulting system was immediately put into a stainless steel autoclave and sealed;

S2: the stainless steel autoclave in step S1 was placed into an oven with a temperature of 110° C. for 12 hours to fully react, then cooled to 20° C., and after that, the resulting materials were taken out, to obtain the silicon-titanium modified graphene slurry.

Wherein, the silicon-titanium modified graphene slurry comprised the following components in parts by weight:
12 parts of a silane coupling agent,
40 parts of an organic solvent,
35 parts of a modified graphene,
10 parts of a high purity nano-titanium powder, and
1 part of distilled water.

Wherein, the organic solvent was methyl pyrrolidone.

Wherein, the functional groups of the silicon molecular modifier used in the preparation of modified graphene were different from those of the silane coupling agent used in the formulation of silicon-titanium modified graphene slurry.

Figure 2:
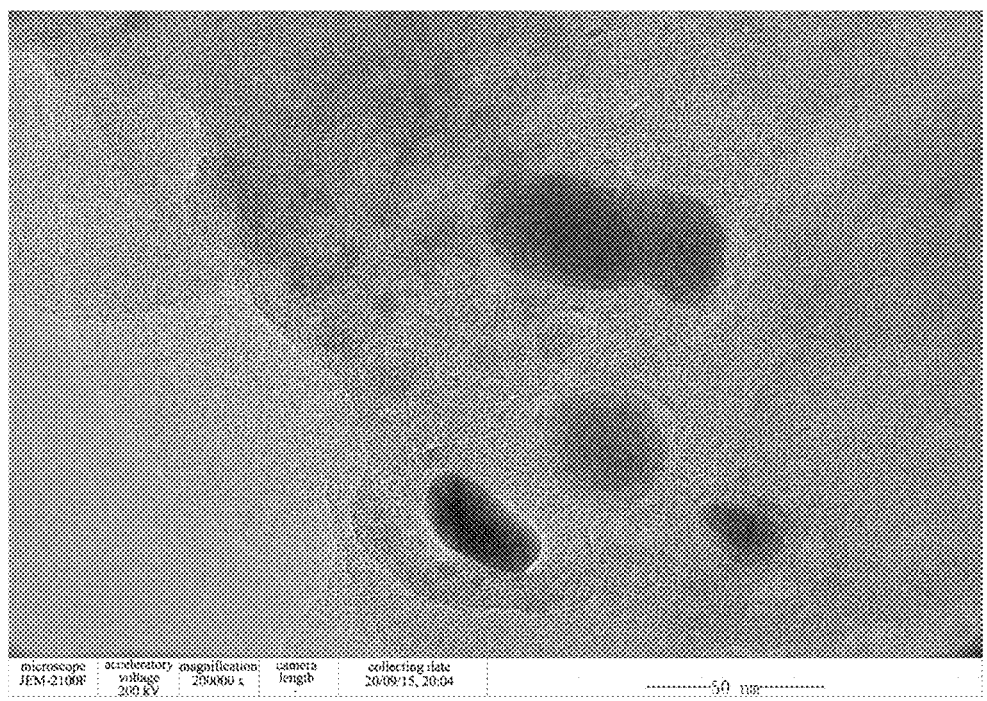
FIG. 2 shows a TEM pattern of the silicon titanium modified graphene slurry as prepared in Example 2.

TEM test was performed on the obtained silicon-titanium modified graphene slurry, and the result was shown in FIG. 2. As shown in FIG. 2, the graphene obtained from the present disclosure had intact and undamaged lamellas, and the amount of the lamellas is few; titanium and silicon have been compounded on the modified graphene.

Example 3

A method for preparing a modified graphene included the following steps:
S1: a flake graphite powder, a silane coupling agent, distilled water and boric acid solution with a molar concentration of 2 mol/L were placed into a stainless steel high pressure bottle, and the bottle was sealed. The air in the bottle was slowly extracted, so that the vacuum degree in the bottle reached 0.1 MPa;
S2: a liquid gas was filled in the stainless steel high pressure bottle in step S1, and the resulting system was shaken well and stood for 28 hours;
S3: the stainless steel high pressure bottle in step S2 was connected to a solid gas preparation apparatus to obtain a solid gas;
S4: the solid gas obtained in step S3 was placed into a ultraviolet washing machine for ultraviolet irradiation until the solid gas was disappeared completely, to obtain a crude modified graphene; and
S5: the crude modified graphene in step S4 was continuously exposed to the ultraviolet light for 30 minutes to remove organic matters contained on the surface of the crude modified graphene, and meanwhile, the functional modification was performed to form carbonyl groups and carbon hydroxyl groups, and the groups was grafted with the silicon hydroxyl formed by the hydrolysis of the silicon molecular modifier by high energy radiation, to obtain a functionalized modified graphene. The modified graphene was stored in vacuum.

Wherein, the raw materials for preparing the modified graphene comprised the following components in parts by weight:
9 parts of a flake graphite powder;
80 parts of a liquid gas;
5 parts of a silicon molecular modifier;
3 parts of distilled water; and
3 parts of a boric acid solution.

Wherein, the flake graphite powder had a particle size of 3000 mesh.

Wherein, the liquid gas was liquid nitrogen.

Wherein, the silicon molecular modifier was the mixture of epoxy silane and mercaptosilane.

Wherein, the solid gas in step S3 had a size of 80 mm×60 mm×30 mm.

Wherein, the ultraviolet washing machine was a drawer type with reflective cover, and the ultraviolet light in the ultraviolet washing machine had wavelengths of 185 nm and 254 nm.

A method for preparing a silicon-titanium modified graphene slurry included the following steps:
S1: a high purity nano-titanium powder, a silane coupling agent and an organic solvent were added into a beaker and mixed uniformly, and then the modified graphene was taken and put into the beaker, the resulting mixture was dispersed by ultrasound, distilled water was added, and then the resulting system was immediately put into a stainless steel autoclave and sealed;
S2: the stainless steel autoclave in step S1 was placed into an oven with a temperature of 120° C. for 6 hours to fully react, then cooled to 30° C., and after that, the resulting materials were taken out, to obtain the silicon-titanium modified graphene slurry.

Wherein, the silicon-titanium modified graphene slurry comprised the following components in parts by weight:
9 parts of a silane coupling agent,
40 parts of an organic solvent,
30 parts of a modified graphene,
20 parts of a high purity nano-titanium powder, and
1 part of distilled water.

Wherein, the organic solvent was methyl pyrrolidone; Wherein, the functional groups of the silicon molecular modifier used in the preparation of modified graphene were different from those of the silane coupling agent used in the formulation of silicon-titanium modified graphene slurry.

Figure 3:
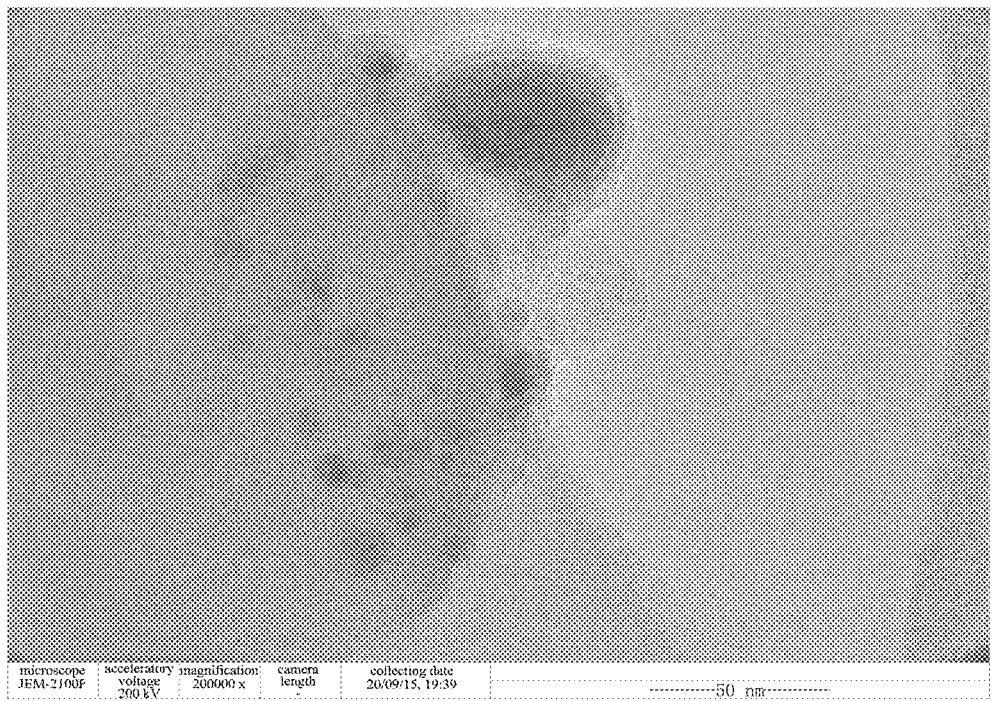
FIG. 3 shows a TEM pattern of the silicon titanium modified graphene slurry as prepared in Example 3.

TEM test was performed on the obtained silicon-titanium modified graphene slurry, and the result was shown in FIG. 3. As shown in FIG. 3, the graphene obtained from the present disclosure had intact and undamaged lamellas, and the amount of the lamellas is few; titanium and silicon have been compounded on the modified graphene.

Performance Testing

The silicon-titanium modified graphene slurries obtained from Examples 1-3 were each mixed with an epoxy resin and a crosslinker to obtain a silicon-titanium-carbon composite modified graphene nano anti-corrosive coating. Wherein, the epoxy resin included bisphenol A epoxy resin 901 and bisphenol A epoxy resin 904 produced by Kunshan Nanya Company (JiangSu, China), and the mass ratio of the bisphenol A epoxy resin 901 to the bisphenol A epoxy resin 904 is 1:1. The crosslinker was purchased from Zhuhai Cardolite Co., Ltd., with the trade name of 2015 cardanol modified phenolic amine. The mass ratio of the epoxy resin, the titanium modified graphene slurry and the crosslinker in the anti-corrosive coating was 75:5:20.

The paintcoats obtained from the graphene nano anti-corrosive coatings were subjected to high temperature and high pressure acid and alkali cooking test, water cooking wet adhesion test, strong acid and alkali soaking test, salt spray test, high-low temperature hot and humid test, boiling saturated salt solution cooking test, sandblasted steel plate adhesion test, rust construction test, and strong acid cooking resistance test. The results were listed in Table 1. A comparative example was carried out, in which the epoxy resin coating without silicon-titanium modified graphene slurry was used.

Wherein, the high temperature and high pressure acid and alkali cooking test was performed by cooking a paintcoat with a thickness of 200 micron in an acid solution with a pH of 3 or in an alkali solution with a pH of 12.5 at a temperature of 150° C. and a pressure of 70 MPa for 24 hours, and observing the blistering and peeling of the paintcoat.

testing the adhesion of the paintcoat obtained from the coating on the surface of the sandblasted steel plate.

The rust construction test was performed by applying the coating on the rust layer with a thickness of 20-60 micron and testing the adhesion of the paintcoat on the rust layer.

The strong acid cooking resistance test was performed by applying the coating on a round steel rod made of polished Q235 carbon steel rod with a dimension of 13 mm×120 mm to form a paintcoat with a thickness of 120-150 micron, and testing the resistance to 10% HCl and 10% $H_2SO_4$ cooking of the paintcoat at a temperature of 60° C.

TABLE 1

Performance test results of the silicon-titanium modified graphene slurries obtained from Examples 1-3 and Comparative Example.

| Test Item | Example 1 | Example 2 | Example 3 | Comparative Example |
|---|---|---|---|---|
| High temperature and high pressure acid and alkali cooking test | No blistering and no peeling | No blistering and no peeling | No blistering and no peeling | Blistering and peeling within 2 h |
| Water cooking wet adhesion test | Level 1 | Level 1 | Level 1 | No pass |
| Strong acid and alkali soaking test | No blistering, no peeling, and no cracking | No blistering, no peeling, and no cracking | No blistering, no peeling, and no cracking | Blistering after 15 days |
| Salt spray test | No blistering, no peeling, and no rust | No blistering, no peeling, and no rust | No blistering, no peeling, and no rust | Blistering, peeling, and rust after 1000 h |
| High-low temperature hot and humid test | No blistering, no peeling, and no cracking | No blistering, no peeling, and no cracking | No blistering, no peeling, and no cracking | Blistering, peeling, and cracking after 1000 h |
| Boiling saturated salt solution cooking test | No blistering, no peeling, and no rust | No blistering, no peeling, and no rust | No blistering, no peeling, and no rust | Blistering, peeling, and rust within 168 h |
| Sandblasted steel plate adhesion test | ≥25 MPa | ≥25 MPa | ≥25 MPa | 6-10 MPa |
| Rust construction test | ≥10 MPa | ≥10 MPa | ≥10 MPa | <5 MPa |
| 60° C. acid cooking resistance test | ≥120 Day | ≥120 Day | ≥120 Day | <7 Day |

The water cooking wet adhesion test was performed by cooking a paintcoat with a thickness of 200 micron in pure water at a temperature of 80° C. for 48 hours, and testing the adhesion grade with a knife pick process.

The strong acid and alkali soaking test was perfomed by soaking a paintcoat in 10% hydrochloric acid, or 10% sulfuric acid, or 10% sodium hydroxide solution at room temperature for more than one year, and observing the blistering, peeling and cracking of the paintcoat.

The salt spray test was performed by subjecting a paintcoat with a thickness of 200 micron to intermittent spraying or salt spray test for more than 10,000 hours (without scratching), and observing the blistering, peeling and rust of the paintcoat.

The high-low temperature hot and humid test was performed by cycling a paintcoat with a thickness of 23 micron once under the conditions of a temperature of −20 to 120° C. and a humidity of 50-95% for every 24 hours, and after 10000 hours, observing the blistering, peeling and cracking of the paintcoat.

The boiling saturated salt solution cooking test was performed by cooking a paintcoat with a thickness of 100 micron in a saturated salt solution at a temperature of 100° C. for 720 hours, and observing the blistering, peeling, and rust of the paintcoat.

The sandblasted steel plate adhesion test was performed by applying the coating to a sandblasted steel plate and As can be seen from Table 1, using the silicon-titanium modified graphene slurry of the present disclosure as a modifier for anti-corrosive coating makes it possible to effectively improve the adhesion and corrosion resistance of the coating.

Finally, it should be noted that the examples as described above are only used to illustrate the technical proposals of the present disclosure, rather than to limit the protection scope of the present disclosure. Although the present disclosure has been described in detail with reference to preferred embodiments, those skilled in the art could understood that the technical proposals of the present disclosure can be modified or equivalently replaced without departing from the principle and scope of the technical proposals of the present disclosure.

What is claimed is:

1. A method for preparing a modified graphene, comprising the following steps:
    S1: putting a flake graphite powder, a silicon molecular modifier, distilled water and a boric acid solution with a molar concentration of 1-2 mol/L into a high pressure container, sealing the container, and forming a vacuum ranging from 0.09 to 0.1 MPa;
    S2: filling at least one liquid gas chosen from liquid carbon dioxide, liquid ozone, and liquid nitrogen into the high pressure container in step S1, shaking and then letting the container stand for 20-28 hours;

S3: connecting the high pressure container in step S2 to a solid gas preparation apparatus, to solidify the liquid gas and obtain a solid gas;

S4: putting the solid gas obtained in step S3 into a ultraviolet washing machine with wavelengths of 185 nm and 254 nm in sequence for ultraviolet high-energy radiation, exfoliating the flake graphite powder to obtain a modified graphene flake, and functionally modifying the modified graphene flake with the solid gas to form carbonyl groups and carbon hydroxyl groups on the surface of the modified graphene flake, and grafting the carbonyl groups and carbon hydroxyl groups with silicon hydroxyl groups to obtain a crude modified graphene; and S5: exposing the crude modified graphene obtained in step S4 to ultraviolet light for 20-60 minutes while functionally modifying as described in step S4 to form carbonyl groups and carbon hydroxyl groups on the surface of the crude modified graphene, and grafting the carbonyl groups and carbon hydroxyl groups with silicon hydroxyl to form a modified graphene.

2. The method of claim 1, wherein raw materials for preparing the modified graphene comprise the following components in parts by weight:
5-25 parts of the flake graphite powder,
70-90 parts of the liquid gas,
1-5 parts of the silicon molecular modifier,
0.5-3 parts of the distilled water, and
1-3 parts of the boric acid solution.

3. The method of claim 1, wherein the flake graphite powder has a particle size of 1000-3000 mesh.

4. The method of claim 1, wherein the silicon molecular modifier is at least one chosen from compounds comprising an Si—OH functional group.

5. The method of claim 4, wherein the flake graphite powder has a particle size of 1000-3000 mesh.

6. The method of claim 4, wherein the silicon molecular modifier is at least one chosen from silane coupling agents.

7. The method of claim 6, wherein the silane coupling agent is at least one chosen from low molecular silica sol, silicone resin, amino silane, epoxy silane, and mercapto silane.

8. The method of claim 1, wherein the solid gas obtained in step S3 has a size of (80-120) mm×(40-60) mm×(10-30) mm.

9. The method of claim 1, wherein the silicon hydroxyl groups are formed by hydrolysis of the silicon molecular modifier with high energy radiation.

10. A method for preparing a silicon-titanium modified graphene slurry, comprising the following steps:

S1: adding a nano-titanium powder, a silane coupling agent and an organic solvent into a container, mixing, adding a modified graphene prepared according to claim 1 into the container, dispersing the contents of the container with ultrasound, and adding distilled water to the container, wherein the silicon molecular modifier used in the preparation of the modified graphene prepared according to claim 1 has functional groups and the silane coupling agent has functional groups different from the functional groups of the modified graphene; and S2: autoclaving at 110-120° C. for 6-12 hours to obtain a silicon-titanium modified graphene slurry.

11. The method of claim 10, wherein the silicon-titanium modified graphene slurry comprises the following components in parts by weight:
8-12 parts of the silane coupling agent,
20-40 parts of the organic solvent,
10-20 parts of the nano-titanium powder,
30-40 parts of the modified graphene, and
0.5-1 parts of the distilled water.

12. The method of claim 10, wherein the organic solvent is at least one chosen from absolute ethanol, acetone, and methylpyrrolidone.

13. The method of claim 10, wherein the silane coupling agent is at least one chosen from low molecular silica sol, silicone resin, amino silane, epoxy silane, and mercapto silane.

14. A silicon-titanium modified graphene slurry, as prepared by the method of claim 10.

15. The method of claim 2, wherein the flake graphite powder has a particle size of 1000-3000 mesh.

16. The method of claim 10, wherein the silicon molecular modifier is at least one chosen from compounds comprising an Si—OH functional group.

17. The method of claim 11, wherein the organic solvent is at least one chosen from absolute ethanol, acetone, and methylpyrrolidone.

18. The method of claim 11, wherein the silane coupling agent is at least one chosen from low molecular silica sol, silicone resin, amino silane, epoxy silane, and mercapto silane.

* * * * *